(12) United States Patent
Weigelt et al.

(10) Patent No.: US 11,035,466 B2
(45) Date of Patent: Jun. 15, 2021

(54) SECURING DEVICE FOR SECURING A STANDSTILL OF AN ELECTRIC VEHICLE

(71) Applicant: Dr. Ing. h.c. F. Porsche Aktiengesellschaft, Stuttgart (DE)

(72) Inventors: Thomas Weigelt, Oberriexingen (DE); Raphael Thomann, Karlsruhe (DE); Gary Avery, Ludwigsburg (DE); Daniel Knoblauch, Leonberg (DE); Gerhard Spengler, Jettingen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 16/779,739

(22) Filed: Feb. 3, 2020

(65) Prior Publication Data
US 2020/0248805 A1 Aug. 6, 2020

(30) Foreign Application Priority Data
Feb. 4, 2019 (DE) .......................... 102019102728.4

(51) Int. Cl.
*F16H 45/02* (2006.01)
*F16H 63/34* (2006.01)
*B60K 23/00* (2006.01)

(52) U.S. Cl.
CPC ......... *F16H 63/3441* (2013.01); *B60K 23/00* (2013.01)

(58) Field of Classification Search
CPC ........................................ F16H 63/3416–3483
See application file for complete search history.

(56) References Cited

U.S. PATENT DOCUMENTS

| 8,844,703 | B2 | 9/2014 | Jang et al. |
| 9,227,506 | B2* | 1/2016 | Mair ........................ F16H 63/34 |
| 10,571,023 | B2* | 2/2020 | Neelakantan ........... F16H 63/48 |
| 2014/0060994 | A1* | 3/2014 | Burgardt ............. F16H 63/3466 192/219.6 |
| 2018/0134271 | A1* | 5/2018 | Okubo .................. B60W 10/18 |
| 2018/0135752 | A1* | 5/2018 | Li ........................ F16H 63/3425 |
| 2018/0154881 | A1* | 6/2018 | Heubner ................. F16D 65/14 |
| 2020/0171940 | A1* | 6/2020 | Ohlig .................... F16H 63/486 |

FOREIGN PATENT DOCUMENTS

| CN | 1153873 A | 7/1997 |
| CN | 102887140 A | 1/2013 |
| CN | 107763163 A | 3/2018 |

* cited by examiner

*Primary Examiner* — Charles A Fox
*Assistant Examiner* — Farhana Pervin
(74) *Attorney, Agent, or Firm* — RatnerPrestia

(57) ABSTRACT

A securing device for securing an electric vehicle in a stationary position. The securing device having a transmission locking device and an axle locking device. The transmission locking device has a transmission locking drive with a transmission locking shaft for driving a transmission lock between a transmission locking position and a transmission release position. The axle locking device has an axle locking drive with an axle locking shaft for driving an axle lock between an axle locking position and an axle release position. The transmission locking shaft and the axle locking shaft are formed independently of one another.

14 Claims, 7 Drawing Sheets

SECURING DEVICE FOR SECURING A STANDSTILL OF AN ELECTRIC VEHICLE

CROSS-REFERENCE TO RELATED APPLICATION

This application claims priority to German Patent Application No. 10 2019 102 728.4, filed Feb. 4, 2019, the content of such application being incorporated by reference herein in its entirety.

FIELD OF THE INVENTION

The present invention relates to a securing device for securing a standstill of an electric vehicle, to a method for securing a standstill of an electric vehicle, and to an electric vehicle having a securing device according to aspects of the invention.

BACKGROUND OF THE INVENTION

It is known that, in electric vehicles and also in normally operated vehicles, the vehicle must, when at a standstill, be secured against rolling away. In the case of vehicles with manual transmissions, this is commonly provided by engaging the first gear ratio. Also, a parking brake additionally in the form of a handbrake can ensure the standstill securing action in such a situation. In the case of automatic transmissions, a separate transmission lock must be engaged, which is also known as park position with the designation "P" in the automatic transmission. In parking situations of the vehicle in an inclined parking position, that is to say for example on a gradient, it is however commonly additionally necessary to likewise additionally use a parking brake as a frictionally engaging brake.

A disadvantage of the known solutions is the high outlay in terms of construction, which arises owing to the combination of two brake devices or securing devices which are entirely separate from one another. In addition to a transmission locking device in the case of an automatic transmission, it is thus necessary for a separate, frictionally engaging brake device to be provided, which is required only in a small number of usage situations, specifically for example when parking on a gradient. This leads to an increased space requirement, increased weight and increased cost requirement in the production of such a vehicle.

SUMMARY OF THE INVENTION

Herein, features and details which are described in conjunction with the securing device according to aspects of the invention self-evidently also apply in conjunction with the method according to aspects of the invention and the electric vehicle according to aspects of the invention and vice versa in each case, and therefore reference is or can be made constantly from one to the other in respect of the disclosure of the individual aspects of the invention.

According to aspects of the invention, a securing device for securing a standstill of an electric vehicle is proposed. A securing device of said type has a transmission locking device and an axle locking device. The transmission locking device is equipped with a transmission locking drive and with a transmission locking shaft for driving a transmission locking means between a transmission locking position and a transmission release position. Furthermore, the axle locking device is formed with an axle locking drive with an axle locking shaft for driving an axle locking means between an axle locking position and an axle release position. The transmission locking shaft and the axle locking shaft are formed independently of one another (e.g., separate parts).

A securing device according to aspects of the invention is thus based fundamentally on the technical considerations of securing an electric vehicle at a standstill in as simple and inexpensive a manner as possible. As has been discussed in the introduction to this application, the securing or the locking of the transmission by means of a known transmission locking device is commonly not sufficient for this purpose. To now be able to omit a frictionally locking or frictional brake in the case of a securing device according to aspects of the invention, an axle locking device is additionally provided here. As the name of the axle locking device suggests, it acts on the driven axle or the drive axle of at least one of the two axles of the electric vehicle. The axle locking device is thus capable, using an axle locking means in the axle locking position, of blocking a rotation of said drive axle or of the driven axle. Here, it is basically sufficient if one wheel drive of said drive axle is blocked by means of the axle locking position of the axle locking means. It is however preferable if the axle locking means, in the axle locking position, can act on both sides of the respective axle and thus also on both sides of the respective wheel of said axle. This makes it possible to avoid an asymmetrical action of the blockage. By virtue of the fact that the securing device however involves a securing action when the electric vehicle is at a standstill, securing a single side of such an axle by means of the axle locking device is basically sufficient.

By virtue of the fact that, now, according to aspects of the invention, a further axle locking device is also provided in addition to the transmission locking device, it is possible to dispense with a separate frictional brake device for securing the standstill. Mechanically movable brake shoes or a so-called handbrake are thus no longer necessary when using a securing device according to aspects of the invention. The existing brake system, which during normal vehicle use is intended to provide the negative acceleration of the vehicle, can accordingly be designed to be smaller, because, in particular in the case of purely electric vehicles, a major part of the braking functionality can be provided by regenerative braking by the electric motor. Aside from the omission of a frictional additional brake, this thus has the effect that, with the aid of a securing device according to aspects of the invention, the normal service brake system of the electric vehicle can also be designed to be smaller, less expensive and of lower weight.

A securing device according to aspects of the invention is thus in particular designed so as not to have a frictional immobilizing brake. This furthermore makes it possible to provide the securing device for the electric vehicle with particularly little outlay and in particular in an autarkic or unitary manner. Not least, it is also conceivable for the axle locking device to be at least partially integrable into a transmission housing.

A core inventive concept of the present invention lies in the two locking devices, that is to say the transmission locking device on the one hand and the axle locking device on the other hand, being formed independently of one another. This independence is understood in particular independently for the respective locking and release movement. The transmission locking shaft is thus, with regard to its own movement capability, entirely mechanically independent of the axle locking shaft. This means that, owing to the mutually independent form, the transmission locking shaft can move freely along the predefined set movements and the axle locking shaft can likewise, without the respective movement influencing the other component. It is thus possible for the transmission locking shaft to rotate whilst the axle locking shaft is static. A joint movement of transmission locking shaft and axle locking shaft simultaneously is also possible within the meaning of the present invention. Here, different rotation speeds or even different directions of rotation are self-evidently also conceivable. An individually operated axle locking shaft without the operation of the transmission locking shaft can also be provided within the meaning of the present invention by means of the mutually independent form. This makes it possible for the individual positions, that is to say the axle locking position and the axle release position and the transmission locking position and the transmission release position, to be assumed freely or substantially freely from one another. Furthermore, in this way, for example in a manner coupled to software, open-loop and/or closed-loop control and thus direct control of the respective locking functionality can be provided. It is thus possible for a multiplicity of differently complex and arbitrary holding situations to also be equipped with different strong securing functionalities. For example, if the vehicle detects that it is situated on a level surface, then locking by means of the transmission locking device is possibly sufficient. This is also possible because the transmission locking means can attain the transmission locking position without the axle locking shaft having to perform a joint movement, this being the case owing to the design independent of the transmission locking shaft. The axle locking means can thus remain in the axle release position. It is furthermore also conceivable, for example for hill start assist systems, for the axle locking drive to be set in motion for the movement of the axle locking shaft in order to engage the axle locking position whilst the transmission locking means is situated in the transmission release position. These are however merely some examples of the mode of functioning of the securing device. As is evident from the two examples above, it is possible to substantially freely select which functions in the vehicle can be implemented independently of one another by the transmission locking device and the axle locking device.

The above securing device according to the present invention may furthermore be of advantageous design if the axle locking means has an axle locking portion which, in the axle locking position, engages in positively locking fashion into a counterpart axle locking portion. A positively locking engagement is conceivable within the meaning of the present invention for example in the form of a dog clutch or a spline shaft connection, for example by means of a sliding sleeve. As an alternative to frictionally engaging locking functionalities that are basically possible, locking with positively locking action leads to increased security. By virtue of the fact that the securing device only has to ensure securing in a standstill state of the electric vehicle, it is thus also the case that no frictional engagement for the purposes of depleting kinetic energy is required here. The hard securing action is associated with increased advantages because it yields the advantages according to aspects of the invention firstly substantially without wear and secondly in a particularly compact manner.

It is furthermore advantageous if, in the case of a securing device according to aspects of the invention, the travel transmission ratio between the transmission locking position and the transmission release position corresponds or substantially corresponds to the travel transmission ratio between the axle locking position and the axle position. Within the meaning of the present invention, a travel transmission ratio corresponds to the entire travel between the locking position and the associated release position and the corresponding transmission ratio of the drive movement. The combination in the travel transmission ratio thus specifies, as it were, the duration of the movement between locking position and release position. By means of controlled coupling of transmission locking drive and axle locking drive and the corresponding coordination between the two travel transmission ratios for example by software coupling, it can be achieved that the movements can be performed at least partially synchronously or even simultaneously or substantially simultaneously. Irrespective of whether both locking drives are available with full functionality, the respective locking position and/or the respective release position is attained temporally or substantially simultaneously owing to the correlation of the travel transmission ratios.

It may furthermore be advantageous if, in the case of a securing device according to aspects of the invention, the transmission locking means and/or the axle locking means has a spring compensator for eliminating a blockage position during a respective drive movement. Such a spring compensator forms a compensation facility in particular in a lateral direction in the presence of a blockage position, that is to say for example a tooth-on-tooth blockage in the case of a dog clutch. A displacement of the respective locking means into the locking position is thus possible in order to ensure secure engagement in the respective locking position even in a blockage situation. The securing functionality is thus considerably improved.

A further advantage can be attained if, in the case of a securing device according to aspects of the invention, the transmission locking device acts on a multi-ratio transmission. Thus, in the case of electric motors, use may also be made of a single-ratio transmission in order to ensure the desired drive functionality. In particular, however, multi-ratio transmissions, preferably with two or more forward gear ratios, are provided in order, even in the case of relatively low-power electric motors, to be able to provide high speed differences on the electric vehicle. The transmission locking device is installed in a multi-ratio transmission of said type and may additionally take the form of the known parking position.

It may furthermore be advantageous if, in the case of a securing device according to aspects of the invention, the axle locking means acts on a first side of a drive axle of the electric vehicle. Said first side is in particular different from a second side of the drive axle, on which a corresponding transmission, for example a so-called torque vectoring transmission, is arranged. This thus means that a locking action by means of the transmission locking device imparts the action on one side of the drive axle, whereas the locking action by means of the axle locking means is provided directly on the drive axle on the other side of the transmission. Here, a locked axle may also be understood as an opened differential, such that locking of the drive axle on both sides is made possible without intervention into the differential structure. As has already been discussed in the introduction, the axle locking means can thus be provided exclusively on a single side of the drive axle, such that an inexpensive and simple construction is realized in order to provide a securing device according to aspects of the invention with a lightweight and compact design.

It is likewise advantageous if, in the case of a securing device according to aspects of the invention, the transmission locking device and/or the axle locking device lock in both directions of rotation of the drive axle. This means that a rotation of the drive axle is prevented or blocked in both directions. Rolling away in a forward direction of the vehicle is thus prevented in the same way as rolling away of the electric vehicle in the reverse direction of the vehicle. This secures the electric vehicle equally in both directions in the case of a parking direction on a gradient. In particular, the locking functionality of the transmission locking device and/or of the axle locking device is symmetrical, such that the locking function is provided in both directions with the same locking security and the same locking forces.

The present invention likewise relates to a method for securing a standstill of an electric vehicle, in particular by means of a securing device according to aspects of the invention, having the following steps:

- performing a transmission locking movement for moving a transmission locking means from a transmission release position into a transmission locking position, and
- performing an axle locking movement for moving an axle locking means from an axle release position into an axle locking position.

Through the reference to a securing device according to aspects of the invention, a method according to aspects of the invention yields the same advantages as have been discussed in detail with reference to a securing device according to aspects of the invention.

It is furthermore advantageous if, in the case of a method according to aspects of the invention, the transmission locking movement and the axle locking movement are, at least in certain portions, performed simultaneously, in particular with an identical start time and/or an identical end time. This leads to a synchronous or at least partially synchronous execution of these two locking movements. The coupling may for example be provided by way of geometrical construction, as has been discussed with reference to the travel transmission ratios. However, in the context of the present invention, coupling by means of open-loop and/or closed-loop control, that is to say a software-based solution to this coupling, is basically also conceivable.

The present invention likewise relates to an electric vehicle having a securing device according to aspects of the invention. An electric vehicle according to aspects of the invention thus yields the same advantages as have been discussed in detail with regard to a securing device according to aspects of the invention.

BRIEF DESCRIPTION OF THE DRAWINGS

Further advantages, features and details of the invention will emerge from the description below in which exemplary embodiments of the invention are described in detail with reference to the drawings. Here, the features mentioned in the claims and in the description may be essential to the invention in each case individually by themselves or in any desired combination. In the drawings:

DETAILED DESCRIPTION OF THE INVENTION

FIGS. 1 to 4 illustrate a first embodiment of a securing device 10 according to aspects of the invention.

Figure 1:
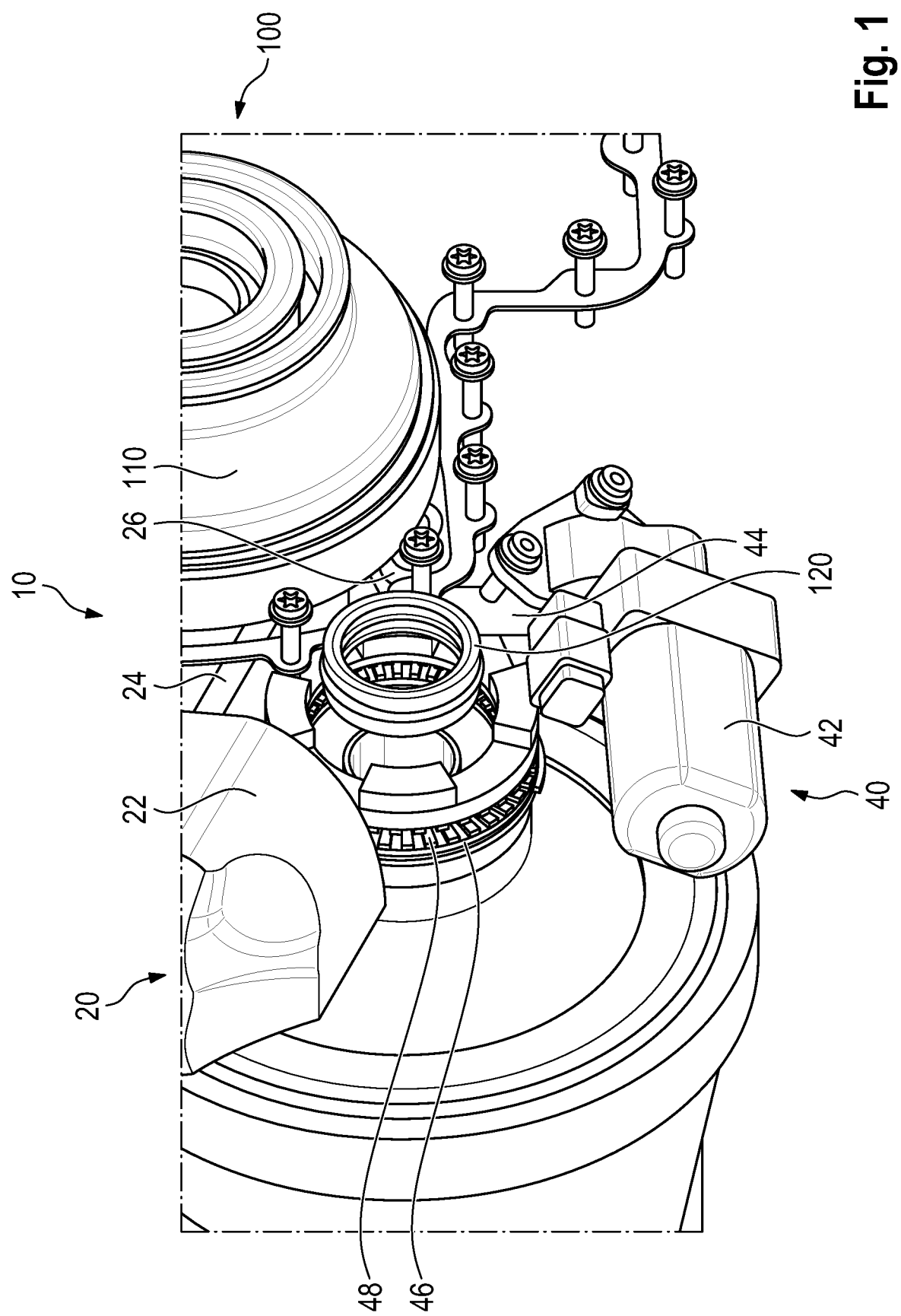
FIG. 1 shows an embodiment of a securing device according to aspects of the invention in a lateral illustration.

FIG. 1 shows a perspective view from below, in particular the combination of the transmission locking device 20 on the top side and of the axle locking device 40 on the bottom side. The axle locking device 40 is in this case equipped with an axle locking drive 42, which, to perform an axle locking movement, can set the axle locking shaft 44 in rotation. The rotation of the axle locking shaft 44 leads to a translational locking movement of the axle locking means 46, which in this case is designed as a dog clutch portion. The corresponding individual dog portions, as axle locking portion 48, can likewise be seen in FIG. 1 on the axle locking means 46. Likewise schematically illustrated is the counterpart axle locking portion 50, which may be arranged in a correspondingly rotationally fixed manner for example on the transmission housing of the multi-ratio transmission 110.

In addition to the locking by the axle locking means 46, the transmission locking device 20 with the transmission locking drive 22 can likewise perform a rotational movement of the transmission locking shaft 24. A schematically illustrated transmission locking means 26 can, in this way, be moved into a transmission locking position GS, such that a movement of the multi-ratio transmission 110 or of the toothed gears in said multi-ratio transmission 110 is prevented.

Figure 2:
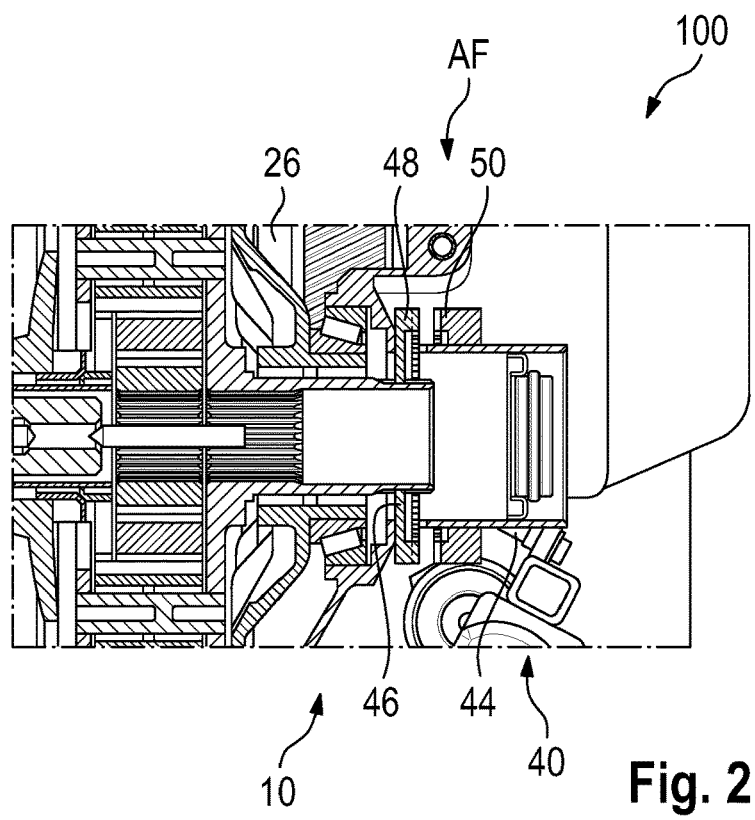
FIG. 2 shows a detail illustration of the embodiment of FIG. 1 with the axle locking means in an axle release position.
Figure 3:
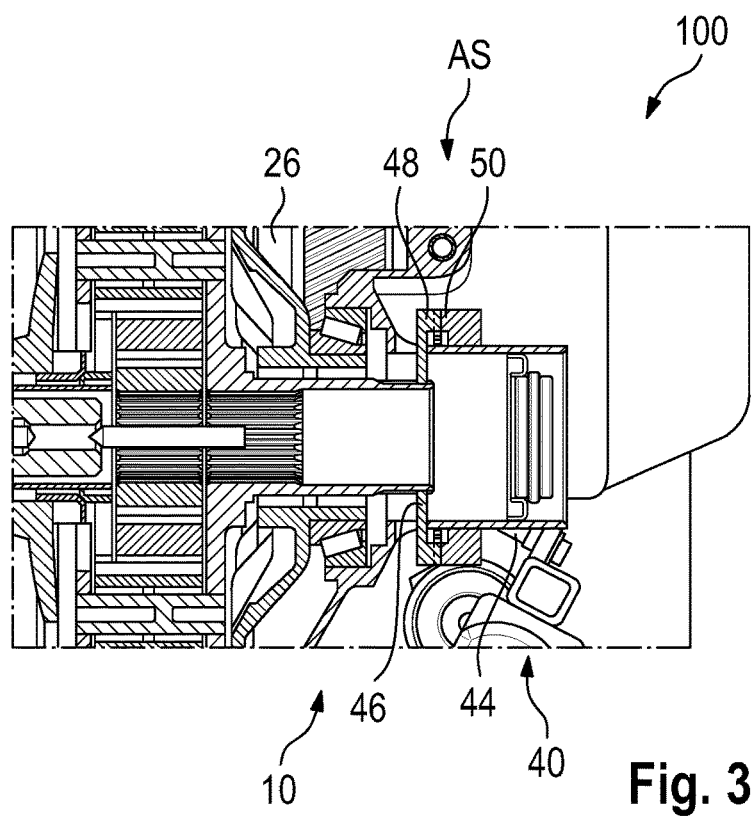
FIG. 3 shows the embodiment of FIGS. 1 and 2 with the axle locking means in the axle locking position.

FIGS. 2 and 3 show, in a schematic cross section, the movement possibilities and the different end positions for the axle locking device 40. Here, the combination of the axle locking means 46 and the transmission locking means 26 can be seen in the electric vehicle 100. To provide a release for the normal driving operation of the electric vehicle 100, the axle locking means 46 must be situated in the axle release position AF as per FIG. 2. If the vehicle is braked or brought to a standstill and a standstill securing action is desired, because the electric vehicle 100 is situated for example on a gradient, it is now possible, independently of the transmission locking device 20, for the axle locking means 46 to be transferred from the axle release position AF of FIG. 2 into the axle locking position AS of FIG. 3 with the aid of the axle locking device by means of the axle locking drive 42. During this movement, the individual dog elements or dog teeth of the axle locking portion 48 engage into the counterpart locking portion 50, which is arranged rotationally fixedly on the transmission housing of the multi-ratio transmission 110. Thus, in the axle locking position AS, a drive axle 120 of the electric vehicle 100 is blocked against rotation, such that the vehicle is secured against rolling away. Owing to the independent drive or the independence between axle locking shaft 44 and transmission locking shaft 24, this movement can be activated and deactivated freely in relation to the activation and deactivation of the locking function of the transmission locking device 20.

Figure 4:
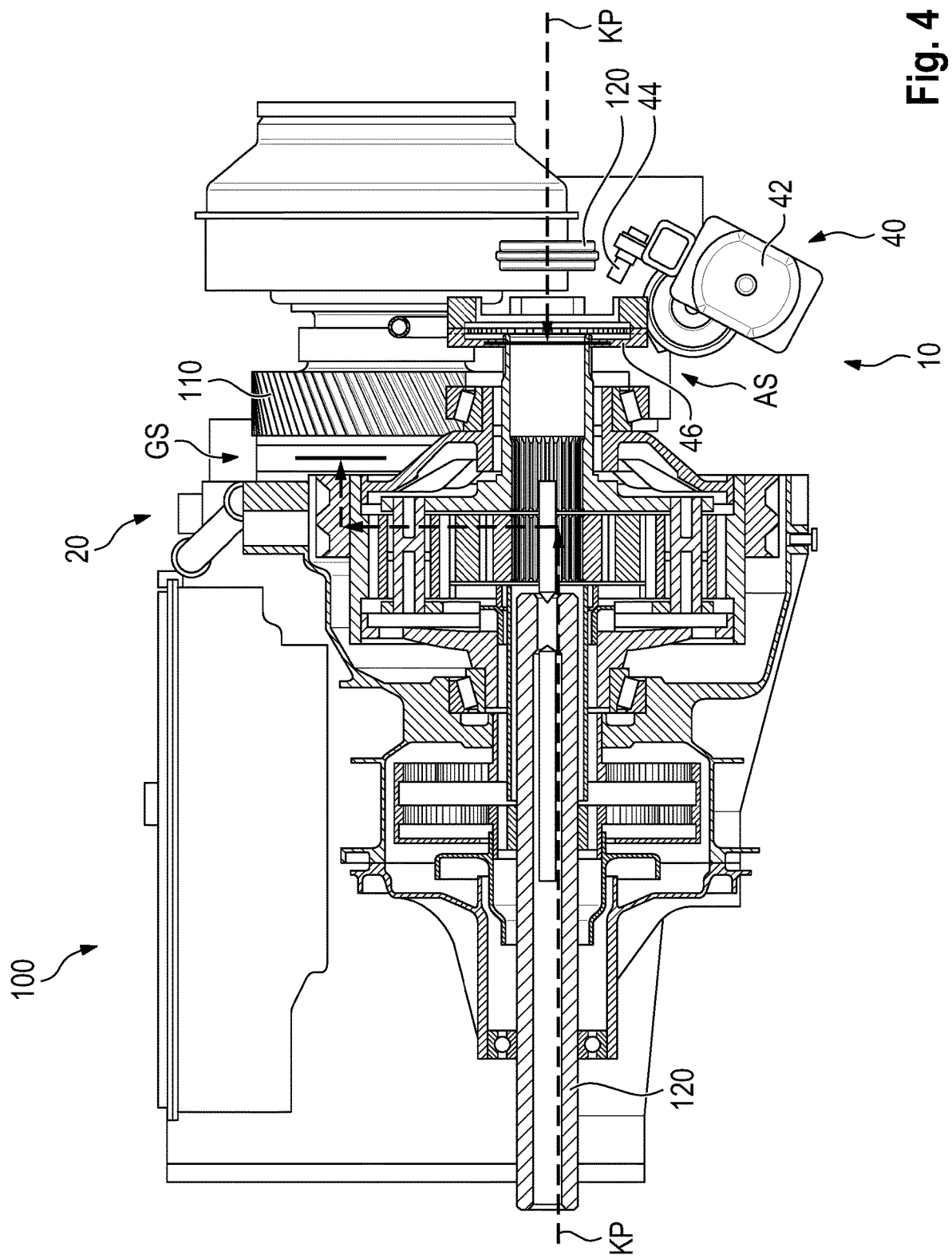
FIG. 4 shows the embodiment of FIGS. 1 to 3 in a frontal illustration.

FIG. 4 shows how this different action can be utilized in a particularly compact design. Here, in a plan view of the electric motor and the transmission of the electric vehicle 100, it can be seen how the force path KP runs from both sides of the drive axle 120 and the in each case left-hand and right-hand drive wheel of said drive axle 120. In FIG. 4, on the right-hand side, the force path KP, for example with the downgrade forces that act on the drive wheel, arranged there, of the electric vehicle 100, firstly reaches the local situation of the axle locking device 40. By virtue of the fact that, in this situation, the axle locking means 46 has been moved into the axle locking position AS by means of the axle locking drive 42 and the locking shaft 44, the force path KP is in this case rotationally fixedly supported for example in the housing of the multi-ratio transmission 110, such that a rotation of said portion of the drive axle 120 is blocked. On the opposite side of the drive axle 120, it is likewise the case that a downgrade force now reaches the multi-ratio transmission 110 via the force path KP. Here, however, the blockage is realized already within the multi-ratio transmission 110 by means of the transmission locking device 20 and in particular the transmission locking means 26 in the transmission locking position GS. The transmission itself within the multi-ratio transmission 110 remains substantially unloaded by the downgrade forces acting on both sides. Here, too, it can be clearly seen how different parking situations and different securing situations can be implemented separately with different modes of functioning of the two separate locking devices. Aside from a free selection, software-based coupling of the two movements is however also conceivable, such that, for example, the respective locking position and the respective release position can be attained simultaneously or substantially simultaneously, for example with the same starting time and/or the same end time.

Figure 5:
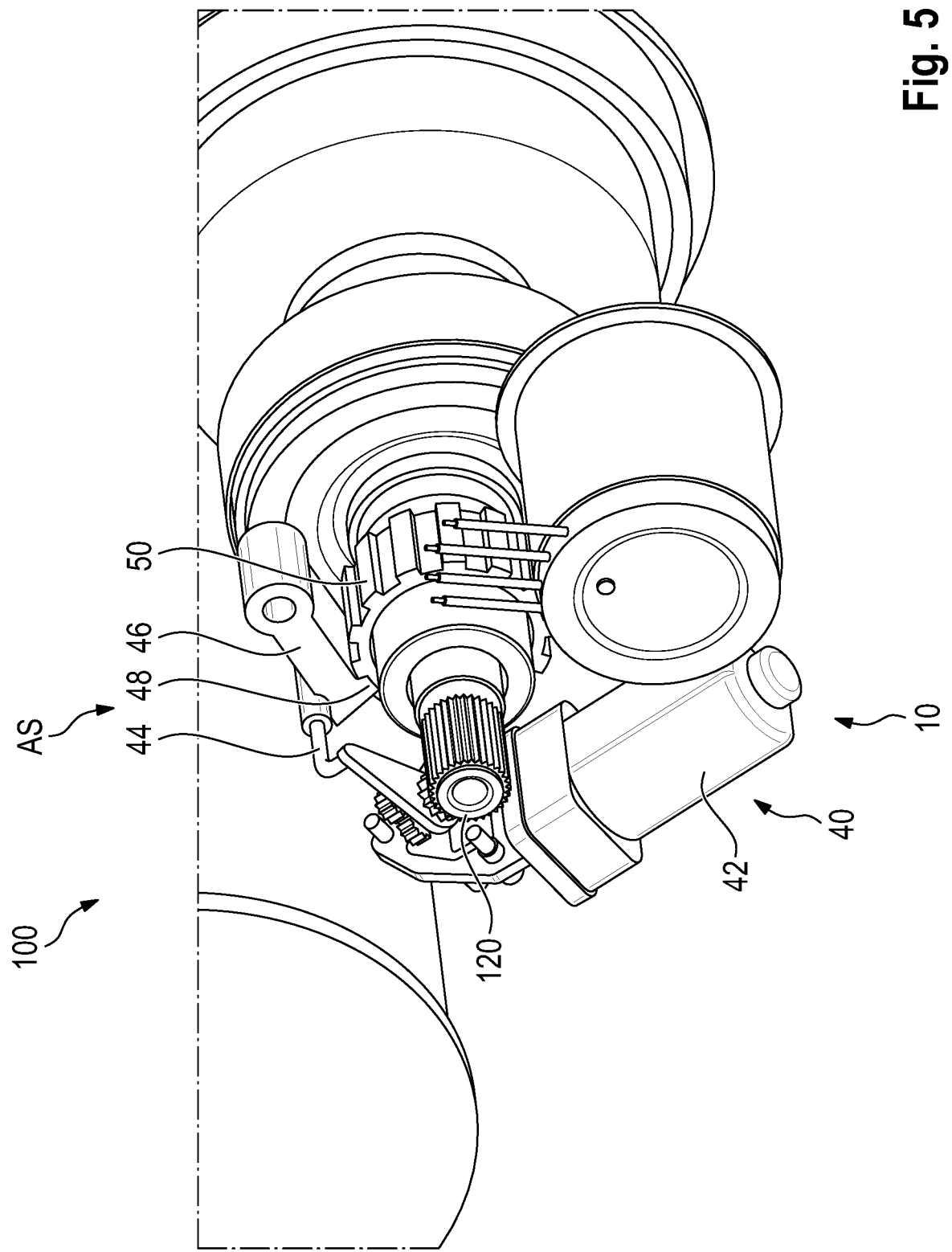
FIG. 5 shows a further embodiment of a securing device according to the invention.
Figure 6:
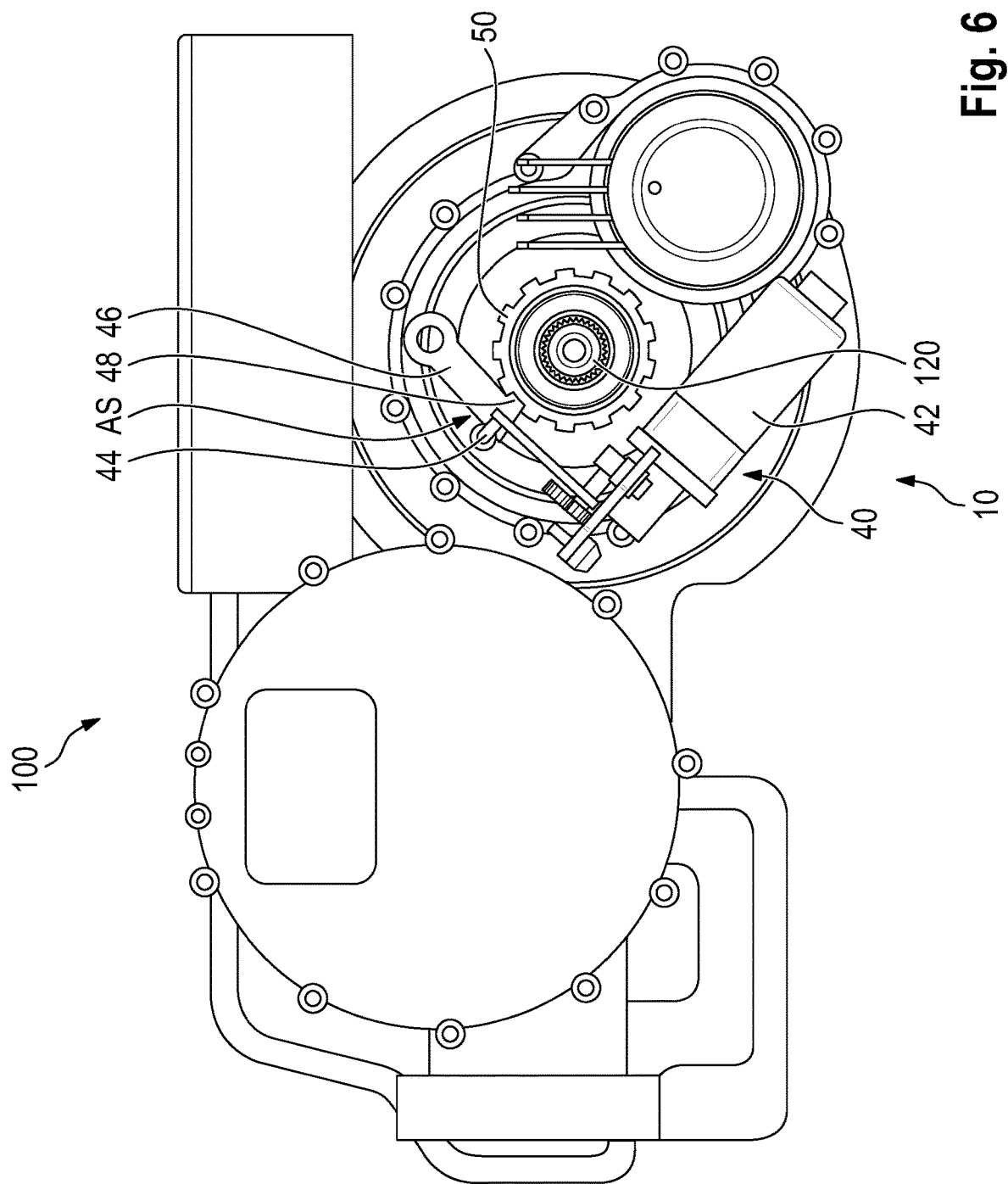
FIG. 6 shows the embodiment of FIG. 5 in a lateral illustration.
Figure 7:
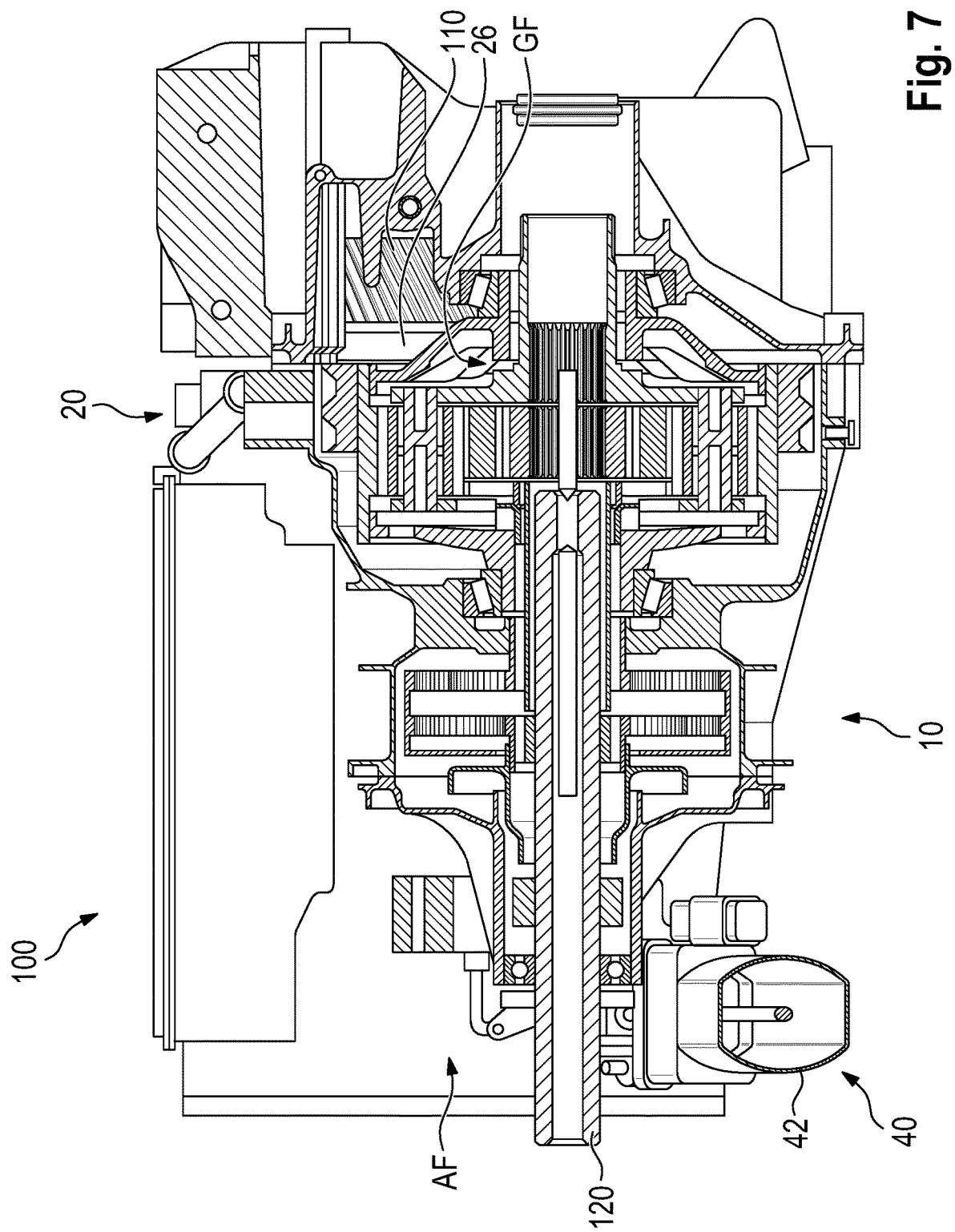
FIG. 7 shows the embodiment of FIGS. 5 and 6 in a partial cross section.

FIGS. 5 to 7 show a further embodiment, which exhibits decisive advantages with regard to flexibility of construction. By virtue of the fact that the axle locking shaft 44 and the transmission locking shaft 24 are designed separately from and independently of one another, provision may be made here for the axle locking device 40 to be arranged at the opposite end of the multi-ratio transmission 110 of the electric vehicle 100. Here, the axle locking portion 48 is, as can be seen particularly clearly in FIGS. 5 and 6, equipped by means of a toothing with a single tooth. It engages in a pinion wheel, arranged on the drive shaft 120, as counterpart axle locking portion 50. Here, too, it can again be clearly seen how the different locking functions of the axle locking device and of the transmission locking device can be implemented separately and independently of one another on different sides of the multi-ratio transmission.

Figure 8:
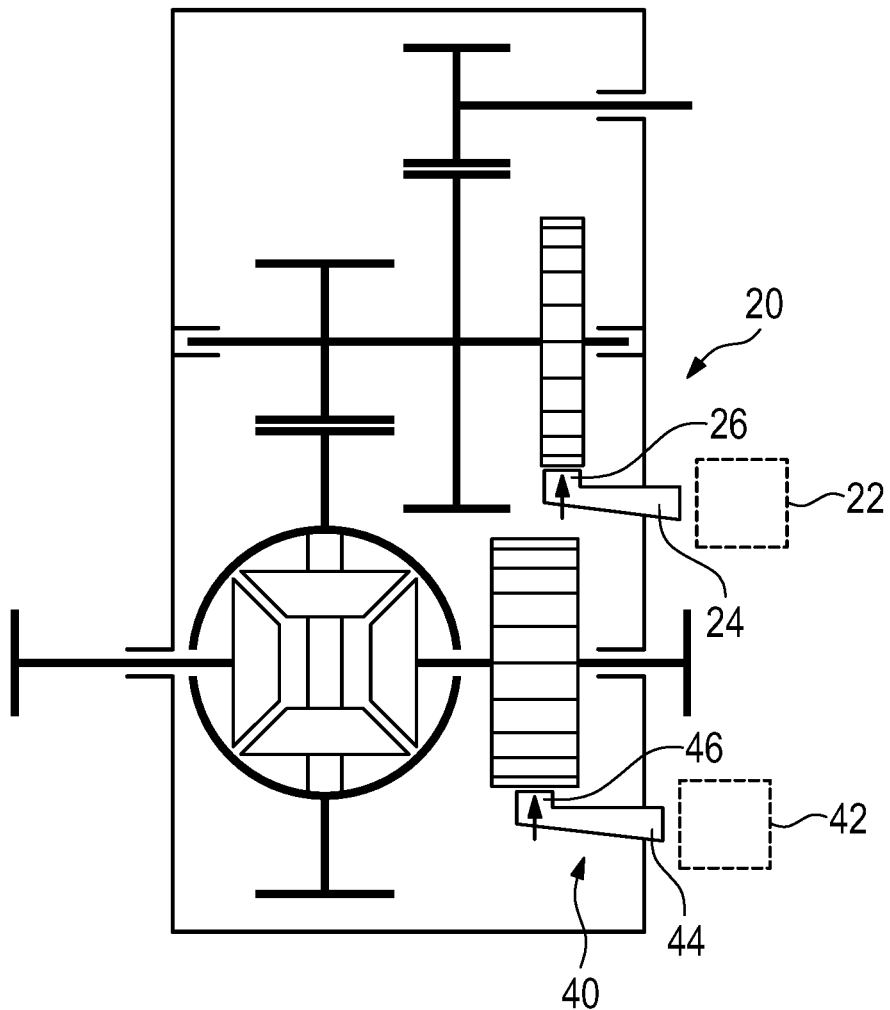
FIG. 8 is a schematic illustration of the securing device according to aspects of the invention.

Finally, FIG. 8 shows a schematic illustration of the securing device 10 for securing a standstill of an electric vehicle 100. The securing device 10 has a transmission locking device 20 and an axle locking device 40. The transmission locking device 20 drives a transmission locking shaft 24 by means of the electromechanical or hydraulic transmission locking drive 22, such that the transmission locking means 26 is movable between a transmission locking position GS and a transmission release position GF. The axle locking device 40 has an electromechanical or hydraulic axle locking drive 42 with an axle locking shaft 44, with which an axle locking means 46 is movable between an axle locking position AS and an axle release position AF. As can also be seen from the schematic illustration, the transmission locking shaft 24 and the axle locking shaft 44 are formed independently of one another.

The above explanation describes the present invention exclusively within the scope of examples. Individual features of the embodiments may of course be freely combined with one another without departing from the scope of the present invention.

What is claimed is:

1. A securing device for securing an electric vehicle in a stationary state, said securing device comprising:
a transmission locking device and an axle locking device,
the transmission locking device including a transmission locking drive with a transmission locking shaft for driving a transmission lock between a transmission locking position (GS) and a transmission release position (GF), and
the axle locking device including an axle locking drive with an axle locking shaft for driving an axle lock between an axle locking position (AS) and an axle release position (AF), and
wherein the transmission locking shaft and the axle locking shaft are independent components,
wherein the transmission locking shaft is configured to rotate to the transmission release position while the axle locking shaft is maintained in the axle locking position.

2. The securing device as claimed in claim 1, wherein the axle lock has an axle locking portion which, in the axle locking position, engages in positively locking fashion into a counterpart axle locking portion.

3. The securing device as claimed in claim 1, wherein a travel transmission ratio between the transmission locking position and the transmission release position corresponds or substantially corresponds to a travel transmission ratio between the axle locking position and the axle release position.

4. The securing device as claimed in claim 1, wherein the axle lock acts on a first side of a drive axle.

5. The securing device as claimed in claim 4, wherein the transmission locking device and/or the axle locking device lock in both directions of rotation of the drive axle.

6. The securing device as claimed in claim 1, wherein the transmission locking drive of the transmission lock is an electromechanical or hydraulic drive.

7. The securing device as claimed in claim 1, wherein the axle locking drive of the axle lock is an electromechanical or hydraulic drive.

8. A method for operating an electric vehicle including a transmission locking device and an axle locking device, the transmission locking device including a transmission locking drive with a transmission locking shaft for driving a transmission lock between a transmission locking position (GS) and a transmission release position (GF), and the axle locking device including an axle locking drive with an axle locking shaft for driving an axle lock between an axle locking position (DS) and an axle release position (DF), said method comprising:
rotating the transmission locking shaft to the transmission release position (GF) while the axle locking shaft is maintained in the axle locking position (DS);
moving the axle lock from the axle locking position (DS) to the axle release position (DF);
performing a transmission locking movement by moving the transmission lock from the transmission release position (GF) into the transmission locking position (GS), and
performing an axle locking movement by moving the axle lock from the axle release position (DF) into the axle locking position (DS) to secure the electric vehicle in a stationary state.

9. The method as claimed in claim 8, wherein the transmission locking movement and the axle locking movement are, at least in certain portions, performed simultaneously with an identical start time and/or an identical end time.

10. An electric vehicle comprising the securing device of claim 1.

11. The method of claim 8, wherein the transmission locking shaft and the axle locking shaft are independent components.

12. The method of claim 8, wherein the axle locking device and the transmission locking device are independent components.

13. The securing device as claimed in claim 1, wherein the axle locking device and the transmission locking device are independent components.

14. The securing device as claimed in claim 1, wherein the axle locking device and the transmission are arranged on different sides of a drive axle.

* * * * *